US010996861B2

(12) United States Patent
Liu et al.

(10) Patent No.: US 10,996,861 B2
(45) Date of Patent: May 4, 2021

(54) METHOD, DEVICE AND COMPUTER PRODUCT FOR PREDICTING DISK FAILURE

(71) Applicant: EMC IP Holding Company LLC, Hopkinton, MA (US)

(72) Inventors: Bing Liu, Tianjin (CN); Xingyu Liu, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/414,196

(22) Filed: May 16, 2019

(65) Prior Publication Data

US 2020/0233587 A1    Jul. 23, 2020

(30) Foreign Application Priority Data

Jan. 18, 2019    (CN) .......................... 201910048750.9

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 3/06* | (2006.01) | |
| *G06N 20/00* | (2019.01) | |

(52) U.S. Cl.
CPC .......... *G06F 3/0616* (2013.01); *G06F 3/0653* (2013.01); *G06F 3/0676* (2013.01); *G06N 20/00* (2019.01)

(58) Field of Classification Search
CPC ... G06F 3/0616; G06F 3/0653; G06F 11/3466
USPC ........................................................ 711/154
See application file for complete search history.

(56) References Cited

U.S. PATENT DOCUMENTS

| | | | |
|---|---|---|---|
| 2003/0149613 A1* | 8/2003 | Cohen .............. | G06Q 10/06398 705/7.42 |
| 2004/0260967 A1* | 12/2004 | Guha .................. | G06F 11/1084 714/3 |
| 2017/0147930 A1* | 5/2017 | Bellala ...................... | G06N 5/04 |
| 2020/0104200 A1* | 4/2020 | Kocberber .............. | G06F 17/18 |

* cited by examiner

*Primary Examiner* — Charles Rones
*Assistant Examiner* — Sidney Li
(74) *Attorney, Agent, or Firm* — Womble Bond Dickinson (US) LLP (57) ABSTRACT

Embodiments of the present disclosure provide method, device and computer product for predicting disk failure. The method disclosed herein comprising: obtaining operation data of a disk, each data item of the operation data indicating values for one or more attributes of the disk at an associated time point; identifying null values for the one or more attributes from the data items of the operation data; adjusting the operation data based at least on the identifying of the null values; and processing the adjusted operation data with a machine learning model, to obtain a failure prediction on whether the disk will fail within a predetermined time period after the associated time point.

20 Claims, 3 Drawing Sheets

METHOD, DEVICE AND COMPUTER PRODUCT FOR PREDICTING DISK FAILURE

CROSS-REFERENCE TO RELATED APPLICATION

This patent application claims priority, under 35 U.S.C. § 119, of Chinese Patent Application No. 201910048750.9, filed Jan. 18, 2019, entitled "METHOD, DEVICE AND COMPUTER PRODUCT FOR PREDICTING DISK FAILURE," which is incorporated by reference herein in its entirety.

FIELD

Embodiments of the present disclosure generally relate to the field of computer, and more specifically, to a method, a device and a computer program product for predicting disk failure.

BACKGROUND

With continuous development of computer technologies, people become more and more rely on storage capabilities on server side. Once failure occurs in any disk of the server, it may cause data loss or service interruption, thus bring huge impact to users. As a result, there is an urgent need to know which disks in the server will fail in the future, so as to replace the hard disk in advance, thereby avoiding unacceptable losses due to the hard disk failure. Therefore, how to effectively predict the possible failure of disks has become a focused issue currently.

SUMMARY

Embodiments of the present disclosure provide a solution for predicting disk failure.

In accordance with the first aspect of the present disclosure, it provides a method for predicting disk failure, comprising: obtaining operation data of a disk, each data item of the operation data indicating values for one or more attributes of the disk at an associated time point; identifying null values for the one or more attributes from the data items of the operation data; adjusting the operation data based at least on the identifying of the null values; and processing the adjusted operation data with a machine learning model, to obtain a failure prediction on whether the disk will fail within a predetermined time period after the associated time point.

In accordance with the second aspect of the present disclosure, it provides a device for predicting disk failure, comprising: at least one processing unit; at least one memory coupled to the at least one processing unit and having instructions stored thereon for execution by the at least one processing unit, the instructions, when executed by the at least one processing unit, cause the device to perform acts comprising: obtaining operation data of a disk, each data item of the operation data indicating values for one or more attributes of the disk at an associated time point; identifying null values for the one or more attributes from the data items of the operation data; adjusting the operation data based at least on the identifying of the null values; and processing the adjusted operation data with a machine learning model, to obtain a failure prediction on whether the disk will fail within a predetermined time period after the associated time point.

In accordance with the third aspect of the present disclosure, it provides a computer product, the computer product is stored in a non-transitory computer storage medium and includes machine executable instructions that, when executed in the device, enable the device to perform any step of the method described in the first aspect according to the present disclosure.

The Summary is provided to introduce concepts in a simplified form, which are further described in the Detailed Description. The Summary neither intends to identify key features or essential features nor limits the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the exemplary embodiments of the present disclosure, the same reference numerals generally denote the same components.

DETAILED DESCRIPTION OF EMBODIMENTS

Preferred embodiments of the present disclosure will be described in more detail below with reference to the accompanying drawings. While the preferred embodiment of the present invention has been shown in the drawings, it should be understood that the present disclosure may be implemented in various forms and should not be limited by the embodiments set forth herein. On the contrary, these embodiments are provided so that this disclosure will be thorough and complete and those skilled in the art will fully understand the scope of the present disclosure.

As used herein, the term "includes" and its variants are to be read as open-ended terms that mean "includes, but is not limited to". Unless specifically stated, the term "or" means "and/or". The term "based on" means "based at least in part on." The terms "one example embodiment" and "an embodiment" mean "at least one example embodiment". The term "another embodiment" means "at least one additional embodiment". The terms "first", "second" and the like may refer to different or identical objects. Other explicit and implicit definitions may also be included below.

As described above, with the continuous development of computer technologies, people become more and more reply on storage capabilities of server. Once failure occurs in any disk of the server, it may cause data loss or service interruption, thus bringing a huge impact to users. Therefore, people are paying more and more attention to how to warn management personnel in advance on possible failures of disk.

In general, disks are equipped with self-monitoring analysis and reporting technology (SMART) to detect and report various reliability metrics of disks. Some of the existing disk failure warning models can predict upcoming failure through SMART data, and some disk manufacturers design SMART data-based failure prediction models installed in disks. However, such a built-in model is merely a prediction based on threshold conditions, which is difficult to provide an effective estimate. In addition, in practical applications, there is usually noise in the raw operation data of the disks collected by the disk manager. In certain cases, the disk manager may not be able to collect values for certain properties of the disk, that is, it is recorded as null in the raw operation data. Existing failure prediction solutions are difficult to make effective disk failure prediction based on these raw operation data.

According to embodiments of the present disclosure, a solution for predicting a disk failure is provided, in which the raw operation data of the disk may be obtained first, each data item of the operation data indicating the value for one or more attributes of the disk at the associated time point. Subsequently, a null value for one or more attributes is identified in the data item of the operation data, and the operation data is adjusted based at least on the identifying of the null values. The adjusted operation data may then be input to a machine learning model to obtain a failure prediction on whether the disk will fail within a predetermined time period after the associated time point. In this way, the raw operation data may be automatically preprocessed to solve the problem that a large number of nulls may exist in the original data, and in addition, the accuracy of disk failure prediction can be improved by using the machine learning model to process the adjusted operation data.

Figure 1:
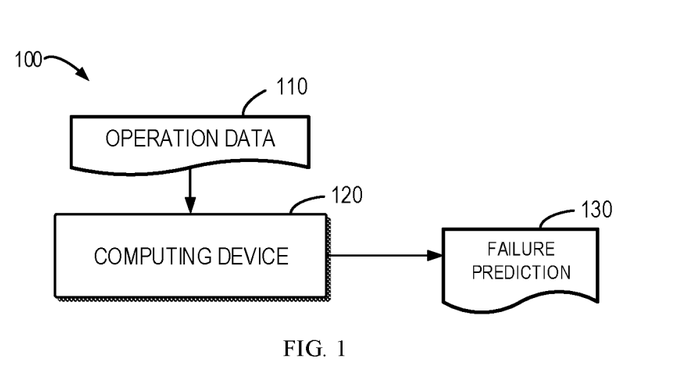
FIG. 1 illustrates a schematic diagram of environment on which embodiments of the present disclosure can be implemented.

Embodiments of the present disclosure will be specifically described below with reference to the drawings. FIG. 1 illustrates a diagram of an example environment 100 where various embodiments of the present disclosure can be implemented. In the example environment 100, the computing device 120 may receive operation data 110 of disk. In some embodiments, the disk manager may collect operation data 110 associated with attributes of one or more disks over a particular time period and store them in memory per time point. These attributes may indicate the operation state of the disk, such as the number of times the disk is powered on, the time of power on, the number of failed sectors within a specific period of time. In some embodiments, the disk manager may collect the operation data 110 of the disk on a daily basis and add a timestamp to each data item to indicate the value for one or more attributes of the disk over a specific period of time.

Figure 2:
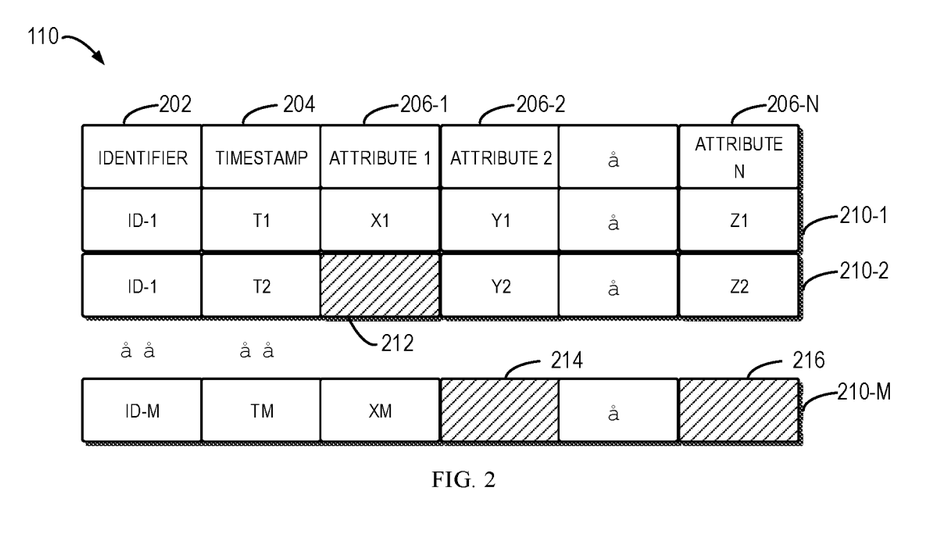
FIG. 2 illustrates a schematic diagram of example operation data according to an embodiment of the present disclosure.

FIG. 2 shows an example operation data 110. As shown in FIG. 2, example operation data 110 may include data items 210-1, 210-2, and 210-M associated with one or more attributes of one or more disks at different time points. For convenience of description, one or more data items 210-1, 210-2, and 210-M are collectively or individually referred to as data items 210.

In some embodiments, as shown in FIG. 2, example operation data 110 may be saved in form of table, where example operation data 110 includes a plurality of fields, e.g., identifier 202, timestamp 204, attribute 1 206-1, attribute 2 206-2, . . . attribute N 206-N. In particular, the identifier 202 may indicate an identifier of the disk corresponding to the data item, such as ID-1 and ID-M; the timestamp 204 may indicate the time point corresponding to the data item. In addition, as mentioned above, in actual application scenario, it is often difficult for the disk manager to obtain the values for all the attributes of the disk, that is, some attributes are null values in the table, for example, the value 212 of attribute 1 of disk ID-1 at timestamp T2, the value 214 of attribute 2 and value 216 of attribute N of disk ID-M at timestamp T3 are null. It is difficult for conventional prediction methods to deal with such noise data having a large amount of null values.

In some embodiments, the disk may be of any suitable type including, but not limited to, a serial attached small computer system interface (SAS) disk, a serial advanced technology attachment (SATA) disk, a solid state drive (SSD), and hard disk drive (HDD), etc.

Continuing reference to FIG. 1, in some embodiments, operation data 110 may be transmitted to computing device 120 by way of wired communication or wireless communication. In some embodiments, the computing device 120 may also directly read operation data 110 stored in a storage device coupled to computing device 120. Computing device 120 may determine failure prediction 130 for the disk based on the received operation data 110. For example, the computing device 120 may give a failure prediction on "a disk may fail within 7 days".

Figure 3:
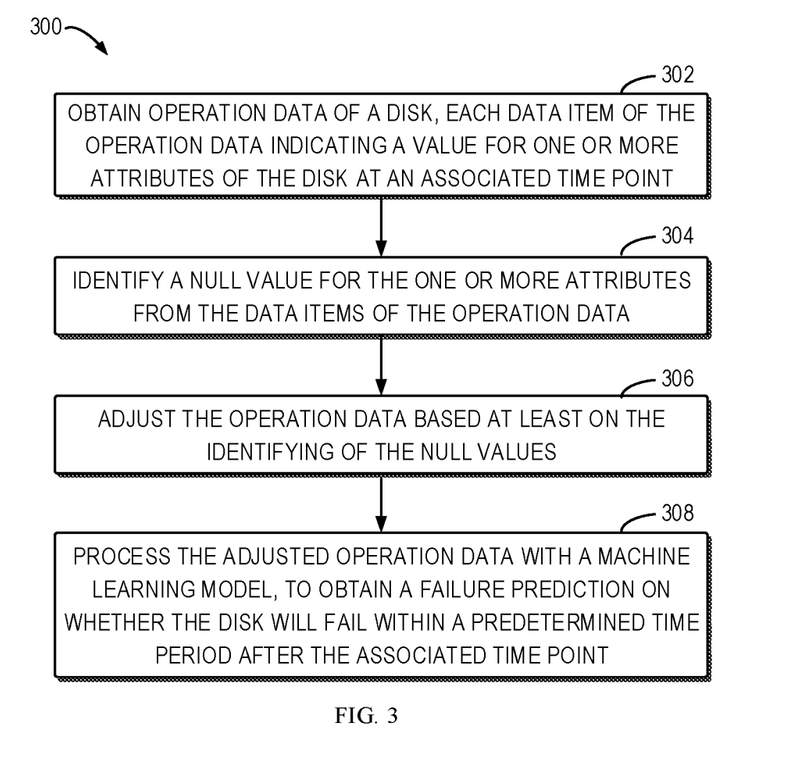
FIG. 3 illustrates a flow chart of a method for predicting disk failure according to an embodiment of the present disclosure.

The process of predicting a disk failure will be described in more detail below with reference to FIG. 3. FIG. 3 illustrates a flow diagram of a process 300 of predicting a disk failure in accordance with some embodiments of the present disclosure. The process 300 may be implemented by the computing device 120 of FIG. 1. For ease of discussion, the process 300 will be described in conjunction with FIG. 1 and FIG. 2.

At block 302, the computing device 120 obtains operation data 110 of the disk, each of the data items in the operation data 110 indicating a value for one or more attributes of the disk at an associated time point. In some embodiments, as described above, the computing device 120 may receive operation data 110 by way of wired communication or wireless communication. Computing device 120 may also read operation data 110 stored in a storage device coupled to computing device 120.

In some embodiments, one or more attributes of the disk include one or more attributes of the SMART category, for example, attributes of the SMART category may include the number of times the disk is powered on, the time of power on, the number of failed sectors, and the like. The operation of the disk's heads, discs, motors, and circuits may be monitored through the attributes of the SMART category, so the properties of the SMART category are also often used to predict disk failures.

In some embodiments, when the disk is a SATA disk, one or more attributes of the disk may also include one or more attributes of a background media scan (BMS) category. These attributes may include, for example, whether a media error has occurred, whether a recovery error has occurred, or the like. Computing device 120 may predict possible failures of SATA type disks more accurately by adding input to the BMS attributes.

In some embodiments, the received operation data 110 may be training data for training a machine learning model. Since the operation data 110 may contain data items for different timestamps of a plurality of different disks, the computing device 120 may group the operation data 110 according to the identifier 202 field of the disk such that data of the same disk is aggregated into the same group. In addition, for a certain group, if any data item in the group is determined to correspond to the failure state, each data item of the entire group may be, for example, added with a label "−1" to distinguish with label "1" labeled for other group without failure.

In some embodiments, for training data, the computing device 120 may adjust a proportion of data items corresponding to the non-failed disk and the data items corresponding to the failed disk, thereby improving the effectiveness of the model training.

At block 304, computing device 120 identifies a null value for one or more attributes from the data items of operation data 110. Taking the example operation data 110 of FIG. 2 as an example, the computing device 120 may identify a null value for one or more attributes from a plurality of data items 210. For example, computing device 120 may identify the value 212 of attribute 1 of disk ID-1 at timestamp T2, both the value 214 of attribute 2 and value 216 of attribute N of disk ID-M at timestamp T3 are null values.

At block 306, computing device 120 adjusts operation data 110 based at least on the identifying of the null values. In some embodiments, when the received operation data 110 is training data, the computing device 120 may determine the proportion of null values identified in the data items of the operation data 110 (referred to as first data items for convenience of description). As shown in FIG. 2, the computing device 120 may determine the proportion of null value of number of attributes of the data item in addition to basic information of disk. For example, assuming N=3 in FIG. 2, the proportion of the null values of the data item 210-2 may be determined as ⅓, and the proportion of the null values of the data item 210-M is ⅔.

The computing device 120 may compare the proportion with a predetermined proportion threshold and in response to the proportion exceeding the proportion threshold, remove the first data item from the operation data 110. For example, the predetermined proportion threshold may be set to ½, i.e., when all general attributes of a data item are null values, computing device 120 may remove the data item from data items. Specifically, in the example of FIG. 2, the computing device 120 may remove data item 210-M from operation data 110 rather than use it as part of the training data since the proportion ⅔ of null values in the data item 210-M is greater than a predetermined proportion threshold ½.

In some embodiments, computing device 120 may set the null value identified in a data item of the operation data to a predetermined value. In some embodiments, the computing device 120 may also set a null value in each data item to an average of the values for the attribute in the group. In some embodiments, the computing device 120 may set the null value in each data item to a predetermined value such as a value of 0 or −999 that can be significantly different from the normal value. Considering that, in most cases, a null value is a reference reflecting a possible failure of the disk, so computing device 120 may predict disk failure more accurately by setting a predetermined value different from normal values. In some embodiments, the computing device 120 may perform a null value assignment operation after removing the data item whose proportion of null value exceeds proportion threshold.

In some embodiments, computing device 120 may also determine, based on the operation data, an attribute variation value indicating a particular attribute of the disk; the attribute variation value indicates a degree of variation at a first time point in the value for the particular attribute of the disk.

In some embodiments, computing device 120 may calculate a difference between a value for a particular attribute of the disk at a first time point and a value for the attribute at a previous time point, e.g., the difference may be expressed as: $|A_i - A_{i-n}|$, where $A_i$ represents the value for the attribute of the disk at the first time point (e.g., the $i^{th}$ day), and $A_{i-n}$ represents the value for the attribute at the previous time point (e.g., n days before the $i^{th}$ day).

In some embodiments, the computing device 120 may calculate the variance of a particular attribute of the disk at a first time point over a predetermined time in the past, for example, the method may be represented as:

$$\sum_{i=1}^{n} p_i \cdot (A_i - \mu)^2,$$

where $p_i$ indicates the probability of the day, specifically the value thereof may be 1/n in this example, $A_i$ represents the value for the attribute of the disk at the first time point (e.g., the $i^{th}$ day), and $\mu$ represents the average of the values for the attributes of disk during these n days.

In some embodiments, computing device 120 may add an attribute variation value to a second data item of the operation data corresponding to the first time point. For example, in the example of FIG. 2, a computing device, computing device 120 may add, for each data item, a feature indicating a degree of variation in the value of each attribute, such as the difference and variance described above. These data may be used to perform more accurate disk failure prediction by adding features that indicate the degree of variation in the value of each attribute.

At block 308, the computing device 120 processes the adjusted operation data with a machine learning model, to obtain a failure prediction on whether the disk will fail within a predetermined time period after an associated time point.

In some embodiments, for the training phase of the machine learning model, the computing device 120 may obtain a respective failure prediction from the adjusted operation data. Further, a failure label corresponding to each data item in the training data may also be input into the machine learning model, where the failure label may correspond to whether the disk failed within a predetermined period of time corresponding to the data item. For example, for a data item associated with the first day of the disk, the label may indicate whether the disk failed within 2 weeks after the first day. The computing device 120 may train the machine learning model by adjusting the distance between the failure prediction on the model and the actual label to obtain a trained disk failure prediction model.

In some embodiments, the machine learning model may be a decision tree model, and preferably, the machine learning model may be the random forest model.

In some embodiments, after completing the training of the model, computing device 120 may also utilize the trained machine learning model to process the test operation data, so as to obtain a test failure prediction of the disk on whether failures occur within a predetermined time period after an associated time point of test operation data. In some embodiments, both the test data and the training data may be historical operation data of the disk. For example, the historical operation data may be divided according to a time point, a portion of which is selected as training data, and the remaining portion is selected as test data.

Figure 4:
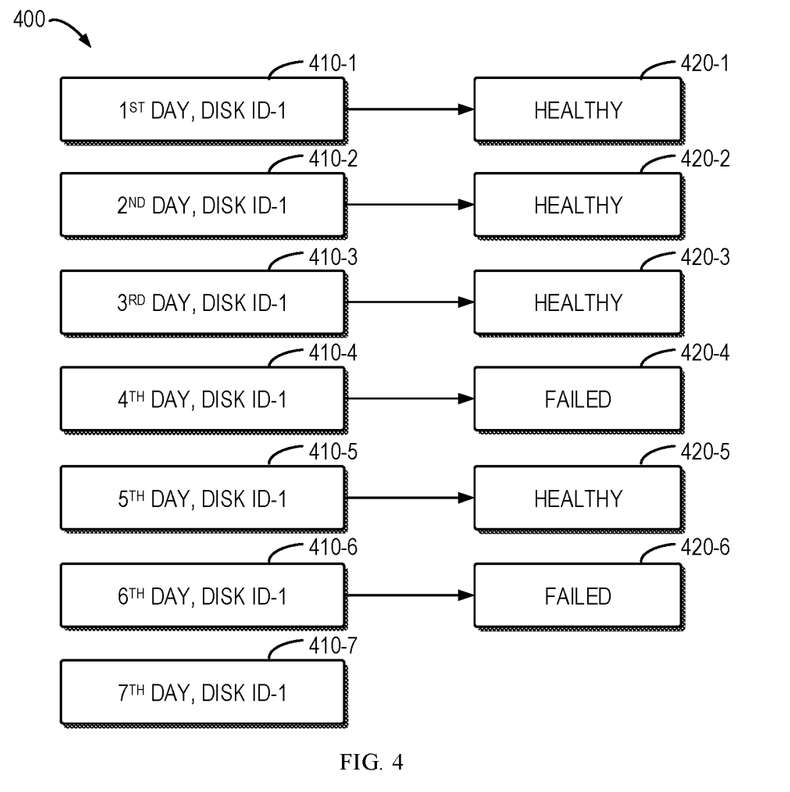
FIG. 4 illustrates a schematic diagram of testing disk failure prediction in accordance with an embodiment of the present disclosure.

In some embodiments, computing device 120 may also synthesize the prediction results for a plurality of data items over a particular time period as a final prediction result. For example, FIG. 4 illustrates a schematic diagram 400 of test failure prediction in accordance with an embodiment of the present disclosure. In this example, the computing device 120 selects data items 410-1, 410-2, 410-3, 410-4, 410-5, 410-6 and 410-7 corresponding to operation state of disk ID-1 in different 7 days. The computing device 120 may use the trained machine learning model to sequentially predict failure labels 420-1, 420-2, 420-3, 420-4, 420-5, and 420-6 corresponding to each data item. Specifically, during the prediction process, when the failure is predicted, the computing device 120 may determine whether the proportion of the failure predicted within a predetermined time period before the associated time point of the failure (referred to as a check period for convenience of description) exceeds predetermined threshold, and if the proportion exceeds the threshold, the computing device 120 outputs the failure prediction as a formal prediction. For example, the computing device 120 may set the predetermined time to 3 days and may set the proportion to ½. For the example of FIG. 4, when the computing device 120 predicts the failure label 420-4 on the fourth day, it only fails on the fourth day within three days, so the failure label 420-4 of the fourth day is not output temporarily, and the failure is predicted on the sixth day again, and when the proportion of the failure predicted exceeds the threshold (½) within 3 days, the computing device 120 may output the prediction as a formal failure prediction. In this manner, the computing device 120 may avoid erroneous predictions due to data abrupt changes in certain situations, thereby improving the accuracy of disk failure prediction.

In some embodiments, computing device 120 may adjust one or more hyper parameters of the machine learning model based on test failure prediction. The computing device 120 may adjust one or more hyper parameters of the machine learning model based on the difference between the results of the test failure prediction and an actual result to further optimize the model, thereby improving the accuracy of the disk failure prediction. In some embodiments, the one or more hyper parameters may comprise the following two categories: model configuration parameters, such as the number of nodes in the decision tree model, the number of layers thereof, etc.; data processing parameters, e.g., length of predetermined time periods for failure prediction, the length of the check period used during use, the size of the time window of data item being input each time point, the number of samples, and so on. The computing device 120 may obtain a more accurate machine learning model, for failure prediction, by adjusting the hyper parameters of the machine learning model during a testing stage.

In some embodiments, upon completion of the model training and test described above, the computing device 120 may use the final machine learning model to receive operation data processed as described above, to obtain a failure prediction of the disk on whether a failure occurs within a predetermined period of time after an associated time point. In some embodiments, after predicting that the disk will fail within a predetermined time, the computing device 120 may alert disk management personnel to perform a feature operation such as replacing the disk.

In some embodiments, during use, with respect to an example in which the machine learning model is a random forest model, the computing device 120 may also display, based on the attribute importance ranking of the random forest model, the importance proportion of one or more attributes being input into the random forest model and thus remind the user which attributes may determine whether the disk will fail to a greater extent, and thereby assist the management personnel to better monitor the state of the disk and is able to replace disks that may have failed timely.

In the manner described above, the solution of present disclosure may be directly applied to the impure original operation data obtained by the disk manager, and the accuracy of the operation data is improved by data preprocessing. A prediction on whether the disk will fail is automatically obtained by the machine learning model based on the processed operation data, greatly improving the accuracy of the disk failure prediction model.

Figure 5:
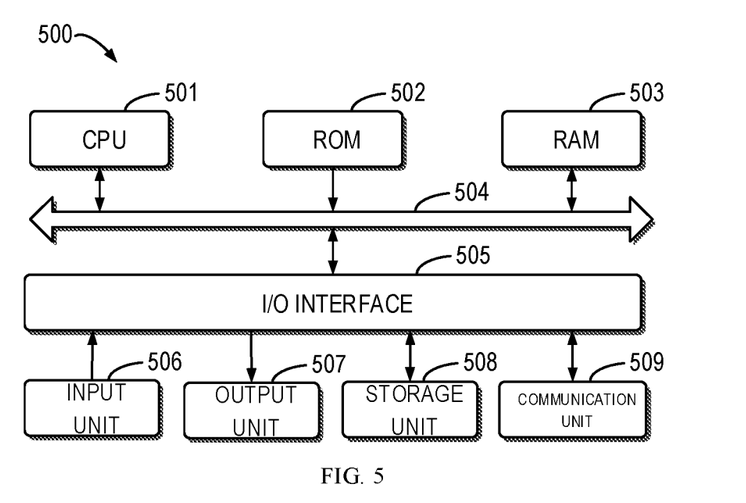
FIG. 5 illustrates a schematic block diagram of an example device which can be used to implement embodiments of the present disclosure.

FIG. 5 shows a schematic block diagram of an example device 500 that can be used to implement embodiments of the present disclosure. For example, the computing device 120 as shown in FIG. 1 may be implemented by a device 500. As shown, the device 500 includes a central processing unit (CPU) 501 that may perform various appropriate actions and process according to computer program instructions stored in read only memory (ROM) 502 or loaded from storage unit 508 into a random access memory (RAM) 503. In the RAM 503, various programs and data required for the operation of the device 500 may also be stored. The CPU 501, the ROM 502, and the RAM 503 are connected to each other through a bus 504. An input/output (I/O) interface 505 is also coupled to the bus 504.

A plurality of components in the device 500 are coupled to the I/O interface 505, including: an input unit 506, such as a keyboard, a mouse, etc.; an output unit 507, such as various types of displays, speakers, etc.; a storage unit 508, such as a disk and an optical disc, etc.; and a communication unit 509 such as a network card, a modem, a wireless communication transceiver, and the like. The communication unit 509 allows the device 500 to exchange information/data with other devices over a computer network such as Internet and/or various telecommunication networks.

The various processes and processing described above, such as the method 300, may be performed by the processing unit 501. For example, in some embodiments, the method 300 may be implemented as a computer software program that is tangibly stored in a machine-readable medium, such as a storage unit 508. In some embodiments, some or the entire computer program may be loaded and/or installed onto the device 500 via the ROM 502 and/or the communication unit 509. One or more actions of method 300 described above may be performed when a computer program is loaded into the RAM 503 and executed by the CPU 501.

The present disclosure may be a method, a device, a system and/or a computer product. The computer product may include a computer-readable storage medium with computer readable program instructions for performing various aspects of the present disclosure thereon.

A computer-readable storage medium may be a tangible device that can hold and store the instructions used by the instruction execution device. The computer-readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer-readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transmitted through an electric wire.

The computer-readable program instructions described herein may be downloaded from a computer-readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer-readable program instructions from the network and forwards the computer-readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operation steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method for predicting disk failure, comprising:
   obtaining operation data of a disk, each data item of the operation data indicating values for one or more attributes of the disk at an associated time point;
   identifying null values for the one or more attributes from the data items of the operation data;
   adjusting the operation data based at least on the identifying of the null values, the adjusted operation data including a difference between a value for each attribute of the data item at a first time and a value for the attribute of the data item at a second time; and
   processing the adjusted operation data with a machine learning model, to obtain a failure prediction on whether the disk will fail within a predetermined time period after the associated time point.

2. The method of claim 1, wherein adjusting the operation data comprises:
   determining a proportion of null values identified in a first data item of the operation data; and in response to the proportion of the null values exceeding a proportion threshold, removing the first data item from the operation data.

3. The method of claim 1, wherein adjusting the operation data comprises:
setting the null values identified in a data item of the operation data to a predetermined value.

4. The method of claim 1, wherein adjusting the operation data further comprises:
determining, based on the operation data, an attribute variation value indicating a particular attribute of the disk, the attribute variation value indicating a degree of variation at a first time point in the value for the particular attribute of the disk; and
adding the attribute variation value to a second data item of the operation data corresponding to the first time point.

5. The method of claim 1, wherein the disk is a serial attached small computer system interface disk, the one or more attributes comprising a background media scan attribute of the disk.

6. The method of claim 1, wherein the machine learning model is a random forest model.

7. The method of claim 1, further comprising:
processing test operation data with the machine learning model to obtain a test failure prediction on whether the disk will fail within a predetermined time period after a respective time point corresponding to the test operation data; and
adjusting one or more hyper parameters of the machine learning model based on the test failure prediction.

8. The method of claim 7, wherein the one or more hyper parameters comprise a length of the predetermined time period.

9. A device for predicting disk failure, comprising:
at least one processing unit;
at least one memory coupled to the at least one processing unit and having instructions stored thereon for execution by the at least one processing unit, the instructions, when executed by the at least one processing unit, cause the at least one processing unit to perform operations, the operations comprising:
obtaining operation data of a disk, each data item of the operation data indicating values for one or more attributes of the disk at an associated time point;
identifying null values for the one or more attributes from the data items of the operation data;
adjusting the operation data based at least on the identifying of the null values, including calculating a difference between a value for each attribute of the data item at a first time and a value for the attribute of the data item at a second time; and
processing the adjusted operation data with a machine learning model, to obtain a failure prediction on whether the disk will fail within a predetermined time period after the associated time point.

10. The device of claim 9, wherein adjusting the operation data comprises:
determining a proportion of null values identified in a first data item of the operation data; and
in response to the proportion of the null values exceeding a proportion threshold, removing the first data item from the operation data.

11. The device of claim 9, wherein adjusting the operation data comprises:
setting the null values identified in a data item of the operation data to a predetermined value.

12. The device of claim 9, wherein adjusting the operation data further comprises:
determining, based on the operation data, an attribute variation value indicating a particular attribute of the disk, the attribute variation value indicating a degree of variation at a first time point in the value for the particular attribute of the disk; and
adding, the attribute variation value to a second data item of the operation data corresponding to the first time point.

13. The device of claim 9, wherein the disk is a serial attached small computer system interface disk, the one or more attributes comprising a background media scan attribute of the disk.

14. The device of claim 9, wherein the machine learning model is a random forest model.

15. The device of claim 9, wherein the operations further comprise:
processing test operation data with the machine learning model to obtain a test failure prediction on whether the disk will fail within a predetermined time period after a respective time point corresponding to the test operation data; and
adjusting one or more hyper parameters of the machine learning model based on the test failure prediction.

16. The device of claim 15, wherein the one or more hyper parameters comprise a length of the predetermined time period.

17. A computer product being stored on a non-transitory computer storage medium and comprising machine-executable instructions which, when executed by a processor, cause the processor to perform operations, the operations comprising:
obtaining operation data of a disk, each data item of the operation data indicating values for one or more attributes of the disk at an associated time point;
identifying null values for the one or more attributes from the data items of the operation data;
adjusting the operation data based at least on the identifying of the null values, including calculating a difference between a value for each attribute of the data item at a first time and a value for the attribute of the data item at a second time; and
processing the adjusted operation data with a machine learning model, to obtain a failure prediction on whether the disk will fail within a predetermined time period after the associated time point.

18. The computer product of claim 17, wherein adjusting the operation data comprises:
determining a proportion of null values identified in a first data item of the operation data; and
in response to the proportion of the null values exceeding a proportion threshold, removing the first data item from the operation data.

19. The method of claim 17, wherein adjusting the operation data comprises:
setting the null values identified in a data item of the operation data to a predetermined value.

20. The method of claim 17, wherein adjusting the operation data further comprises:
determining, based on the operation data, an attribute variation value indicating a particular attribute of the disk, the attribute variation value indicating a degree of variation at a first time point in the value for the particular attribute of the disk; and adding the attribute variation value to a second data item of the operation data corresponding to the first time point.

* * * * *